United States Patent [19]

Kerschbaum et al.

[11] Patent Number: 4,716,000
[45] Date of Patent: Dec. 29, 1987

[54] PROCESS AND APPARATUS FOR THE PRODUCTION OF A CROSS-LINKED, EXTRUDED OR SPRAYED PRODUCT

[75] Inventors: Kurt Kerschbaum, Klosterneuburg; Alfred Konicka, Vienna, both of Austria

[73] Assignee: Rosendahl Maschinen Gesellschaft m.b.H., Maria Enzersdorf, Austria

[21] Appl. No.: 790,255

[22] Filed: Oct. 22, 1985

[30] Foreign Application Priority Data

Oct. 22, 1984 [AT] Austria ................................. 3364/84

[51] Int. Cl.⁴ ............................................. B29C 47/62
[52] U.S. Cl. ...................................... 264/83; 264/174; 264/221.24; 264/236; 264/347; 264/349; 425/206; 425/207; 425/208
[58] Field of Search ................. 264/83, 236, 347, 174, 264/349, 211.24; 425/445, 208, 206, 207

[56] References Cited

U.S. PATENT DOCUMENTS

| | | | |
|---|---|---|---|
| 3,711,067 | 1/1973 | Kovacs | 425/207 |
| 4,058,583 | 11/1977 | Glander et al. | 264/176 R |
| 4,117,063 | 9/1978 | Voight et al. | 264/176 R |
| 4,117,195 | 9/1978 | Swarbrick et al. | 428/379 |
| 4,136,132 | 1/1979 | Poole | 264/211 |
| 4,489,029 | 12/1984 | Keogh et al. | 264/174 |
| 4,564,349 | 1/1986 | Brown | 425/207 |

FOREIGN PATENT DOCUMENTS

| | | |
|---|---|---|
| 2558638 | 7/1977 | Fed. Rep. of Germany ...... 425/208 |
| 2636709 | 2/1978 | Fed. Rep. of Germany . |
| 2832120 | 1/1980 | Fed. Rep. of Germany ...... 264/174 |
| 2916185 | 10/1980 | Fed. Rep. of Germany ...... 264/174 |
| 964428 | 7/1964 | United Kingdom . |
| 1450934 | 9/1976 | United Kingdom . |

Primary Examiner—Jeffery Thurlow
Attorney, Agent, or Firm—Cushman, Darby & Cushman

[57] ABSTRACT

A process and apparatus for producing a cross-linked, extruded or sprayed product.

4 Claims, 2 Drawing Figures

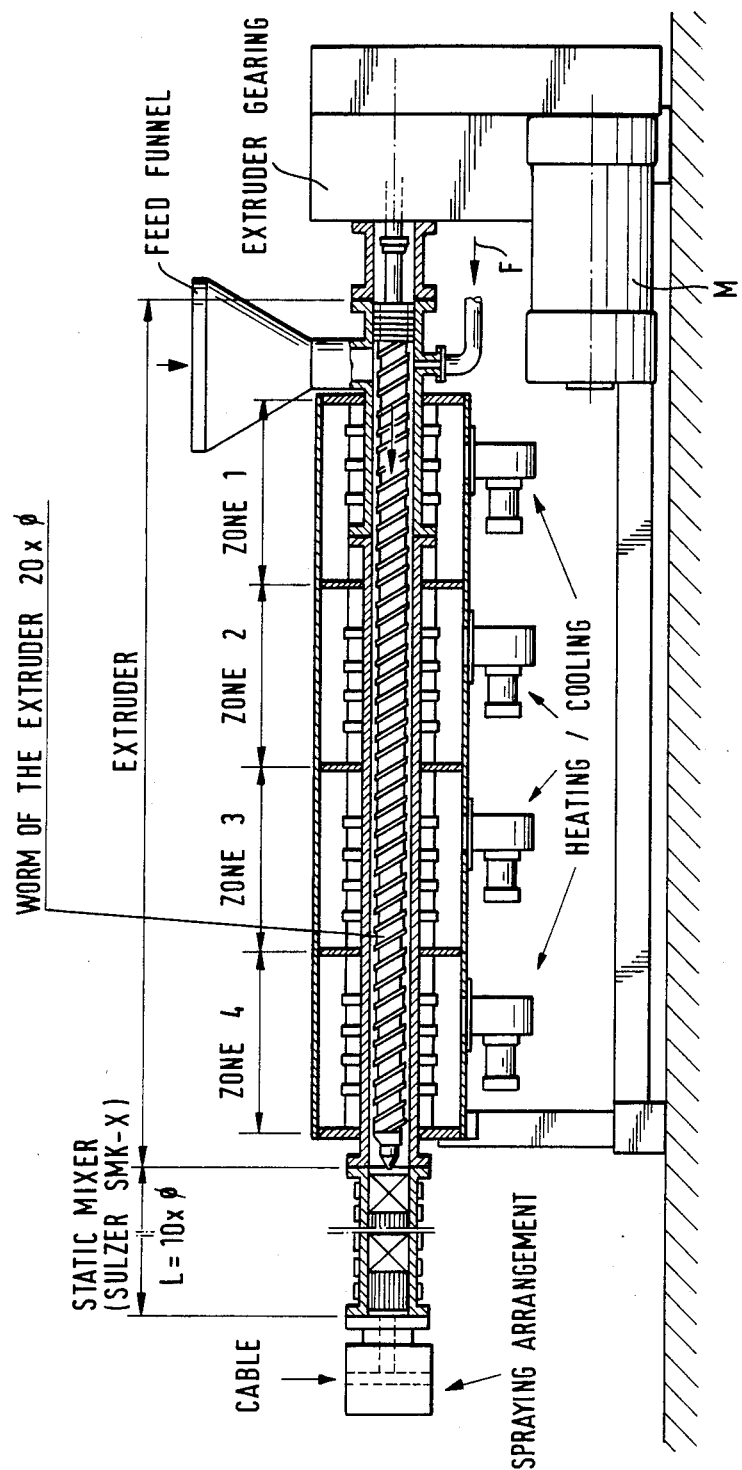

PROCESS AND APPARATUS FOR THE PRODUCTION OF A CROSS-LINKED, EXTRUDED OR SPRAYED PRODUCT

FIELD OF THE INVENTION

The present invention relates to a process and apparatus for the production of a cross-linked, extruded or sprayed product composed of a cross-linkable polymer which is cross-linked in the presence of a hydrolyzable, unsaturated silane, of a free radical initiator and of a silanol condensation catalyst. The cited compounding agents are admixed with the polymer while increasing the temperature to the plugging (crosslinking/grafting) temperature, conveying of the mixed mass to a hollow space (mold) wherein the product is obtained by cross-linking the curing mass in the form of the shaped product in the presence of and by action of moisture. The silane is grafted onto the polymer.

BACKGROUND OF THE INVENTION

It has been known for a long time to change the characteristics of polyethylene and other olefinic polymers by heating such polymers in the presence of cross-linking agents such as organic peroxides. Disadvantageously, however, this process requires particularly careful process controls to prevent premature or too strong combination of the polymer molecules which results in formation of a solidified polymer mass in the apparatus. Also, the objects made from such modified polymers typically are not shape retentive.

Therefore, efforts have been made to devise a better controllable and adjustable process for the cross-linking of olefinic polymers. One such a process consists of grafting an organosilane compound onto the polymer. Such a process has entered the literature as Sioplas-process (cf. Wire Journal, May 1977, pp. 88–92, "Cross-linked Polyethylene Insulations Using the Sioplas Technology"). The organosilane compound contains at least one silicon-bound, hydrolyzable group and one group capable of reacting with free radical sites, which subsequently results in a cross-linking by the influence of moisture by way of the silane, coupling reaction.

There are several known proposals to conduct such a process. In the British Pat. No. 1,234,034 (Midland Silicones), the grafting takes place by mechanically processing the mixture in which case free radical sites develop on the polymer which may be joined by the silane compound. British Pat. No. 1,286,460 (Dow Corning) describes adding compounds which form free radicals, which compounds have a half-life period of less than 6 minutes at the given reaction temperatures; a temperature of about 140° C. is proposed as a reaction temperature. The free radical initiators are organic peroxides and per-esters such as, for example, benzoyl peroxide, dicumyl peroxide, azo compounds and others.

The process may also be applied to certain cross-linked or cross-linkable copolymers of ethylene and alkylracrylates as is described in British Pat. No. 1,396,120 (Dow Corning).

In the course of further research in this field, it turned out that under certain circumstances, the first stage of the above-cited process is critical insofar as the melting index of the polymers grafted with the silane compound in the presence of peroxides and peresters was clearly reduced in relation to the starting polymers. Whenever now the starting material had already a relatively low melting index, then it could occur that in the case of a subsequent shaping as a result of the melting index which was reduced still further, problems resulted. The selection of very special free radical builders (initiators) for carrying out the process in such a case was capable of preventing this difficulty. The suitable free radical builders turned out compounds having the general formula:

wherein R″ is a secondary or tertiary alkyl radical, a cycloalkyl radical having greater than 4 carbon atoms or a benzyl radical, and R‴ is a tertiary alkyl radical or a cumyl radical. Here too, the reaction is carried out again at a temperature at which the free radical builder has a half-life period of below 6 min. This process is described in the British Pat. No. 1,450,934 (Dow Corning) and in the French Pat. No. 2,217,363 (Dow Corning) based on the former.

Basically, one conducts, in that case, the mixing and grafting either with cascade extruders, such as according to the Austrian Pat. No. 362,569 (BICC) or ther German OS No. 2 636 709 (Gutehoffnungshuette) or with a very long, one-worm extruder according to the Austrian Pat. No. 345,554 (BICC-Maillefer). The path by way of the cascade extruder is very expensive and is connected with high investments as a result of which the profitability is not questioned to be sure, but the write-off of such an installation must be made over a prolonged period of time. Far more interesting is the process by way of the one-worm extruder.

The process using the one-worm extruder is described in the Austrian Pat. No. 345,554. A process for producing a cross-linked, extruded product from a graftable and cross-linkable polymer with the help of a hydrolyzable, unsaturated silane compounding agent, includes mixing the polymer and the entire compounding agents in the same cylinder of a worm extruding machine. The worm extruding machine has, in sequence, a premixing zone, a homogenizing zone and is a dosing zone.

At the same time, as results from a reference to the British Pat. No. 964,428, the homogenizing zone is either formed by a worm having a decreasing inclination in the direction toward the extruding head wherein the base of the groove remaining between the bridge in the area of the second half of the homogenizing zone is provided with bores leading to a central channel of the worm which leads to the end of the worm facing the extruder head, or which is formed by a two-thread worm whereby the two threads have a variable rise so that the two threads pass over into one another at the beginning and at the end of the homogenizing zone. The molten material is transferred from the one spiral groove into the other spiral groove by way of the cylinder between the bridges of the worm and the cylinder surrounding them. In practice, the bridges of the worm showing a variable inclination act as dynanic mixer. However, such worms can be produced only at very great cost.

SUMMARY AND OBJECTS OF THE INVENTION

The present invention provides a process for producing a cross-linked, extruded or sprayed product starting from a polymer which is cross-linkable with the help of a hydrolyzable, unsaturated silane, of a free radical builder and of a silanol condensation catalyst by mixing the cited compounding agents with the polymer while increasing the temperature to grafting temperature, transfering the thus mixed mass of reactants to a hollow space for the formation of a product as well as crosslinking of the grafted mass in the formed product by the action of moisture. More particularly, the process is characterized by intermixing of the compounding agents with the polymer by transfering the component(s) which is (are) in the process of plastification from a space having a decreasing cross-section in the direction the components are being conveyed into a second space connected with the former by a gap, which second space increases in cross-section in the direction the components are being conveyed, whereby the sum of the cross-sections of both spaces decreases by way of the conveying path. A strand from the premixed plastified components is then formed. The thus formed strand is separated into a multiplicity of strands. Subsequently the multiplicity of strands are reunited to form one strand. The thus admixed mass is introduced into the hollow space. Essentially in that section (zone) of the conveying path in which the strand is divided into a multiplicity of strands and these are united again, the mixed mass is exposed to the grafting temperature.

The present invention also provides an apparatus for carrying out the above process. The apparatus includes a dosing arrangement leading into a heatable (if desired) cylinder wherein a worm is rotatably disposed and a channel adjacent to the worm leads to a hollow space whereby the worm is developed as a two-thread worm, one spiral groove of which has a cross-section over the length of the worm decreasing to zero toward the channel and the other spiral groove of which has a cross-section over its length increasing from zero in this direction wherein the sum of the cross-sections of both spiral grooves decreases in the direction of the channel and both spiral grooves have the same gradient. A static mixer is provided in the channel.

The apparatus also includes an embodiment wherein one spiral groove has a constant width but a depth decreasing toward the channel or the static mixer and another spiral groove, beginning after a feeding zone for the granulate, is provided having a constant depth but a width increasing in the direction of the static mixer (B).

Further, the apparatus includes features wherein the projection of the bottom of the groove of the one spiral groove corresponds to a section of an Archimedean spiral.

It is the object of the present invention to provide a process of the initially cited type which may be carried out in practice with relatively simple and uncomplicated arrangements.

A further object of the present invention is to propose an apparatus to carry out the process of the invention, which apparatus is distinguished by a special, simple, novel combination of cooperating elements.

BRIEF DESCRIPTION OF THE DRAWING

FIG. 2 is a lengthwise cross-section of suitable apparatus.

DETAILED DESCRIPTION OF THE INVENTION

Figure 1:
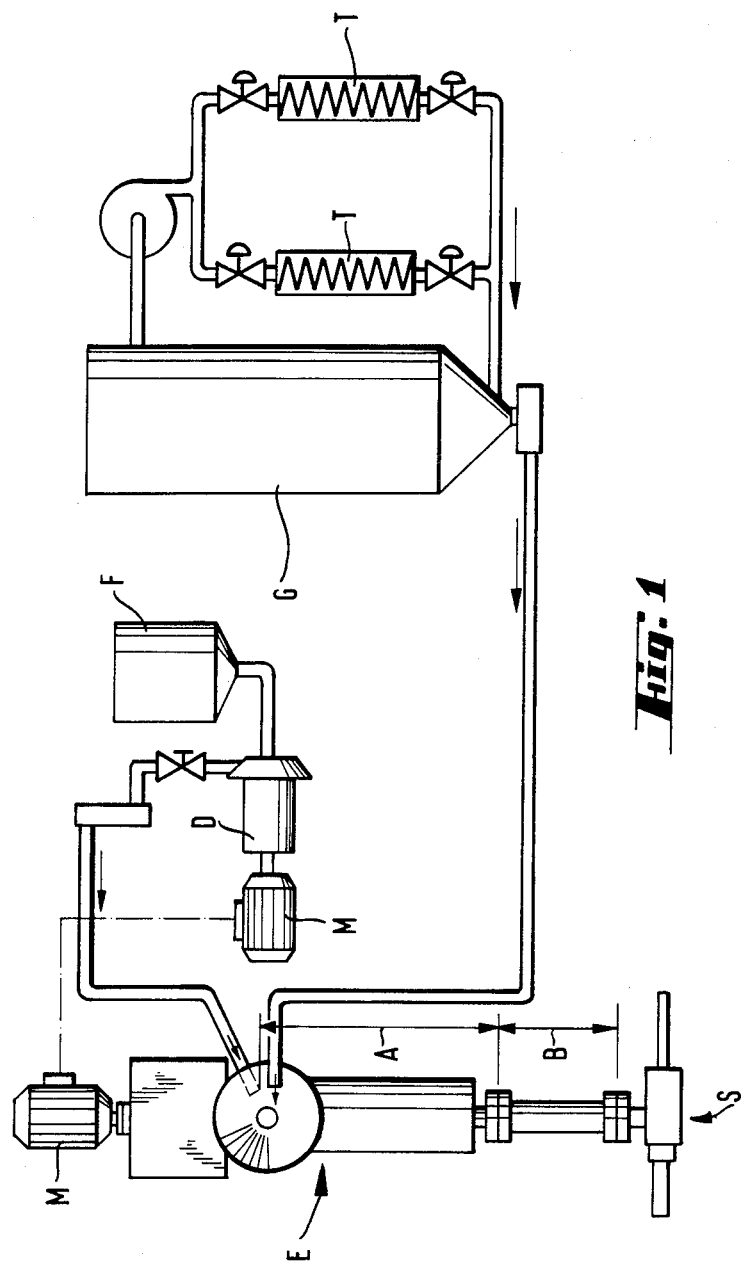
FIG. 1 schematically illustrates the process and apparatus of the present invention.

The objects of the present invention are achieved through the fact that the intermixing of the compounding agents with the polymer takes place by transferring the component(s) which are in the process of plastification from a space becoming smaller in cross-section in the direction of conveyance of the components into a space connected with the former by a gap and increasing in cross-section in the direction of conveyance of the components, whereby the sum of the cross-sections of both spaces decreases by way of the conveying path, formation of a strand from the premixed plastified components and separating of this strand into a multiplicity of strands and subsequent uniting of these strands, after which the mass mixed in this way is fed to the hollow space of forms, whereby essentially in that part of the conveying path in which the strand is divided into a multiplicity of strands and these are united again, the thus admixed mass is exposed (heated) to the grafting temperature. In this way, a very intimate intermixing of the components is attained whereby an essentially substantially homogenous mass mixture of the components is obtained. Just before the thus described mass is inserted into a form hollow space, it is exposed to the grafting temperature at the point in time at which the components are already intimately mixed with one another. Very favorable conditions are thus provided for a good cross-linking without any difficulties arising in case of the processing in an extruder or the like. At the same time, the process may be carried out with a relatively simple arrangement.

In the apparatus embodiment having a dosing arrangement leading into a heatable (optional) cylinder wherein the cylinder has a worm disposed rotatably therein and wherein a channel adjacent to the worm leads to a form hollow space, the present invention provides that in the channel leading to the hollow space of the form, a static mixer is disposed. The worm is developed as a two-thread worm, one spiral groove of which has a cross-section over the length of the worm decreasing to zero toward the channel and the other spiral groove of which has a cross-section over its length increasing from zero in this direction, and the sum of the cross-sections of both spiral grooves decreases in the direction of the channel and both spiral grooves have the same gradient. A conventional static mixture can be employed.

Such a worm may be produced relatively easily. A static mixer also has a very simple construction and consists essentially of guiding arrangements dividing the strand and bringing it together again. Such a mixer may for example have a structure as is described in the journal "Plast-Verarbeiter" [plast-processor] 34th Edition, May 1983, pp. 423–426, the disclosure of which is hereby incorporated by reference.

The effective length of the mixer depends on the desired material throughput. It is possible at the same time to connect several such mixing elements in succession. The mixer is kept at grafting temperatures. An exemplary grafting temperature is about 230° C.

For the homogenization of the melt, arrangements like the Sulzer mixing head SMK-X are also suitable. The disclosure of Synthetic No. 11/1983 is incorporated herein by reference. Also, those skilled in the art may refer to Sulzer technical bulletins from April 1983 to June 1984. Mixing heads of this type are built directly into the nozzle of injection molding machines and contain several, in most cases 4–6 mixing elements which likewise serve to decompose, i.e. prevent or break-up, inhomogeneities in the mixture being processed therethrough.

The Keenics mixer also has a favorable arrangement which mixer is used successfully in this connection.

For example, an extruding head with shaping tool follows the static mixer. The head is kept likewise at a temperature of about 230° C.

The temperatures stated may naturally be adapted and varied in the extruder and in the static mixer depending on the composition of the starting components.

The grafted melt obtained in this matter has a high degree of homogeneity and guarantees a very even cross-linking. Especially in the area of the isolations, above all in the case of cable isolations with medium and high voltage area, this characteristic bears weight.

With the construction according to the present invention, it is also possible to get along with worms of the customary length. For example, it is possible with a 20 D-worm to process plastic material and the silane compound, for example, vinyl trimethonoxy silane (VTMOS). The extruder screw, thus for example, may have a length of about 20 to 30 times its diameter. At the same time it will be possible to use the following temperatures over the length of the worm.

Zone 1 130° C. 5x D
Zone 2 190° C. 5XD
Zone 3 190° C. 5XD
Zone 4 230° C. 5XD whereby the zone 1 is in the area of the end of feeding in and the zone 4 is at the end of the worm on the side of the extruder head.

At the same time, the molten polymer mixed into a homogenous mass is fed to the static mixer in which the mass is kept at a grafting temperature of for example 230° C., whereby the mass in the static mixer is homogenized thermally and the grafting reaction takes place there.

According to a further characteristic of the present invention, it will be possible to provide that the one spiral groove has a constant width but a decreasing depth toward the static mixer (B), and the other spiral groove beginning after a feeding in zone for the granulate, has a constant depth and a width which increases toward the static mixer. As a result of that, a very simple construction will result for the worm which may be produced relatively simply.

At the same time, it is particularly advantageous whenever the projection of the bottom of the groove of the one spiral groove corresponds to a section of an Archimedean spiral, as a result of which an even decrease of the cross-section of this groove will result.

However, it should be stated basically that the process according to the present invention is not bound to the described arrangement. Thus, the process according to the present invention may alkso be carried out, for example, with extruders which show a mixing zone known among experts as Maddock mixing zone, Troester mixing zone, or a Bamag-Hartig mixing zone, whereby one may do in the arrangements without several worms disposed one behind the other. Furthermore, the process according to the present invention may also be carried out successfully on an extruder of the construction series RE of the firm Rosendahl Ges.m.b.H, Maria Enzersdorf, Austria, which is followed by a static mixer. Exemplary RE-Extruders are disclosed in "RE-Extruder. fur die kabelindustrie RE 20" published by the aformentioned company.

For the process according to the present invention, it will be possible to use, for example, the polymers and formulations disclosed in British Pat. No. 1,450,934; British Pat. No. 1,396,120; British Pat. No. 1,234,034 and British Pat. No. 1,286,460, the disclosures of which are hereby incorporated by reference.

The following components have been found to be particularly advantageous:

1. Mixing of silane VTMOS, dicumylperoxide and dibutyl tin dilaurate, which are obtainable commercially (I). (For example, VS 401-C of the firm Union Carbide, Versoix-Geneva).

2. A polyethylene copolymerizate with 3% VA with a density of 0.975 and an MFI of 2.5 filled with soot and with a stabilization suitable for the silane cross-linking (II). (For example, high-pressure polyethylene ventilation duct V 2512 JX black 92157 of the BASF Ludwigshafen).

3. As a variant to 2, a polyethylene with a density of 0.920 and an MFI of 0.2 as well as stabilization (III) adapted for the silane cross-linking. (For example, DFDM 5951 of the firm BP Chemical, Geneva). The formulation is as follows:

(A)

100 parts of product II
1.5 parts of product I (B)

100 parts of product III
1.5 parts of product I

A special mixer or a special dosing device are not necessary in this case. If the residual moisture of the granulate is too high, then water may be withdrawn from the granulate by, for example, a granulate drier of the firm Cramer Apparatebau, Kierspe/Federal Republic of Germany and to convey this granulate with a conveying device into the funnel of the extruder. Such a granulate drier is described in a prospectus published by said firm, "Cramer-Trackner fur kunstoff-Granulate".

The liquid component is dosed in a dosing station, for example, of the firm SWISSCAB, Yvonand, Switzerland, into the lower part of the funnel synchronously to the number of rotations of the worm.

In the attached drawing, the illustration for carrying out the process according to the present invention is shown in more detail in a preferred embodiment:

As is clear from this schematic drawing, the plastic granulate reaches by way of the dry cells T and the granulate drier G in the direction of the arrow the receiving funnel of the extruder E. The liquid component F will likewise be fed there by way of the dosing pump D. The mass is mixed in the extruder E which shows in the part A the worm part with a distinct emphasis. The motors M serve for the driving of the extruder or of the dosing pump. The static mixer B in which the grafting process takes place mainly succeeds the extruder part A. The spraying arrangement has been designated by S.

In the subsequent non-limiting examples, compositions and achieved results are stated. In all cases, one operates with a standard extruder of the firm Rosendahl and a Sulzer mixer.

EXAMPLE 1

Formulation according to A.

EXAMPLE 2

Formulation according to A, however with 1.8 parts of product I.

EXAMPLE 3

Formulation according to B.

EXAMPLE 4

Formulation according to B, however with 1.8 parts of product I.

The values achieved with the formulations of these examples are listed in Table I:

TABLE

| Example | 1 | 2 | 3 | 4 |
|---|---|---|---|---|
| Gel-content % | 75 | 79 | 76 | 78 |
| Tensile strength MPa | 16 | 18 | 15 | 19 |
| Elongation at Break (Bruchdrehung) | 260 | 290 | 250 | 280 |
| Hot set at 200°, 15 min and 20 N/cm$^2$ % | 90 | 50 | 95 | 60 |

As becomes clear from the Examples 1 to 4 and the attached table, one will achieve surprisingly with a static mixer which was switched behind a commercial standard extruder an absolutely correct grafting quality. For the cross-linking of the synthetic material, there followed a treatment in hot water at 90° C. for approximately 6 hours.

The disclosure of Austrian Application A 3364/84 is incorporated herein by reference.

What is claimed is:

1. A process for producing a cross-linked, extruded or sprayed product, comprising:
    (a) feeding components consisting essentially of a cross-linked polymer in the presence of hydrolyzable, unsaturated silane, a free radical which admits an initiator, and a silanol condensation catalyst to a heatable cylinder having first and second ends, said first end receiving said components from a feeding means and said second and delivering said product to a molding means,
    said components being admixed by a mechanical worm being rotatably disposed inside said cylinder, said worm being of a two-thread type with a channel formed adjacent to said worm, leading to said molding means, said two-thread worm having,
        a first spiral groove defined by said threads with a cross-section over the length of said worm decreasing to approximately zero,
        a second spiral groove defined by said threads having a cross-section over the length of said worm increasing from approximately zero in the opposite direction of said first spiral groove, and the sum of said cross-sections of said first and second spiral grooves decreasing toward said channel with both spiral grooves having substantially equal gradients, and
    said admixed components forming a strand being conveyed in said channel to static mixing means disposed in said channel toward said second end of said cylinder, said static mixing means separating said strand into a plurality of strands with subsequent uniting of said plurality of strands, producing a mixed mass,
    (b) raising the temperature during step (a) to enable grafting of said admixed components,
    (c) transferring the grafted mixture of steps (a) and (b) to a mold in the presence of water to cause cross-linking of said grafted mixture, and to form a product.

2. An apparatus for producing a cross-linked, extruded or sprayed product comprising:
    means for feeding chemical components of said product;
    means for molding said product;
    a heatable cylinder having first and second ends, said first end receiving said components from said feeding means and said second end delivering said product to said molding means, said cylinder including,
    a mechanical worm being rotatably disposed inside said cylinder to mix said components, said worm being of a two-thread type with a channel formed adjacent to said worm leading to said molding means, said two-thread worm having,
        a first spiral groove defined by said threads with a cross-section over the length of said worm decreasing to approximately zero,
        a second spiral groove defined by said threads having a cross-section over the length of said worm increasing from approximately zero in the opposite direction of said first spiral groove, and the sum of said cross-sections of said first and second spiral grooves decreasing toward said channel both spiral grooves having substantially equal gradients,
    means for static mixing of said components, being disposed in said channel toward said second end of said cylinder.

3. Apparatus according to claim 2 wherein one spiral groove has a constant width and a depth decreasing toward the static mixer, and another spiral groove, beginning after a feeding zone for said components, has a constant depth and a width increasing in the direction of the static mixer.

4. Apparatus according to claim 2 wherein the projection of the bottom of the groove of the one spiral groove corresponds to a section of an Archimedean spiral.

* * * * *